(No Model.)
P. W. PRATT.
FURNITURE PAD.
No. 336,346.     Patented Feb. 16, 1886.
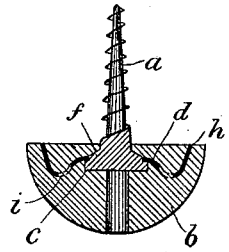
Fig. 1.
Fig. 5.
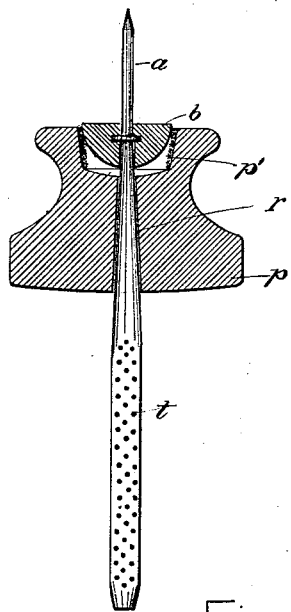
Fig. 2.
Fig. 6.
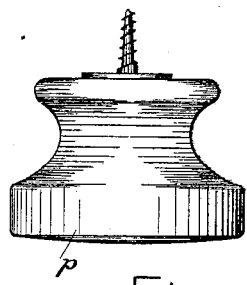
Fig. 3.
Fig. 8.
Fig. 7.
Fig. 4.
Fig. 9.
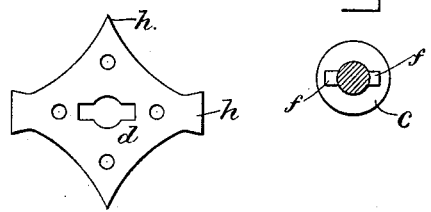
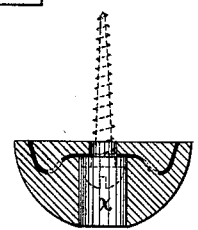
Witnesses
John F. Nelson
Fred L. Emery
Inventor
Philip W Pratt
by Crosby & Gregory Attys

UNITED STATES PATENT OFFICE.

PHILIP W. PRATT, OF ABINGTON, MASSACHUSETTS.

FURNITURE-PAD.

SPECIFICATION forming part of Letters Patent No. 336,346, dated February 16, 1886.

Application filed March 2, 1885. Serial No. 157,466. (No model.)

*To all whom it may concern:*

Be it known that I, PHILIP W. PRATT, of Abington, county of Plymouth, State of Massachusetts, have invented an Improvement in Furniture-Pads, of which the following description, in connection with the accompanying drawings, is a specification, like letters on the drawings representing like parts.

My invention relates to a furniture pad or cushion composed of a piece of elastic rubber having connected with it a metal shank adapted to enter the piece of furniture—such, for instance, as the bottom of the leg of a chair—to prevent the same from scratching or injuring the surface with which it may come in contact, and also to prevent noise.

The invention consists, mainly, in the means by which a proper connection is effected between the rubber and metal shank, which is shown in this instance as having a screw-thread, so that it may be turned into the piece of furniture to which the cushion or pad is to be attached. The metal shank or screw is provided with an enlarged head, which engages a plate or washer upon which the rubber is molded and vulcanized, the said plate being shown in this instance as of thin metal, provided with fingers or points, and also with openings between and into which the rubber enters, thus uniting firmly therewith and forming a strong connection between the rubber and screw-shank, by which the latter is caused to accompany the former in its rotary movement. The portion of the washer that engages the head of the screw or shank is concaved, leaving a bearing-surface of considerable extent projecting beyond the said head, so that in case the rubber should become worn away the furniture would come to a bearing on the said washer, which would not scratch or mar other surfaces, as would be the case if the said head were not sunk below the hard bearing-surface.

Figure 1 represents in vertical section a furniture-pad embodying this invention; Fig. 2, a side elevation of the washer or device forming the connection between the metal shank and the soft pad or cushion; Fig. 3, a face view of the said washer; Fig. 4, a sectional view of the screw or shank, looking toward the head thereof; and Figs. 5 and 6, a side elevation and longitudinal section, respectively, of a tool or instrument for applying the pad or cushion to the furniture, but which is not herein claimed, the same being reserved for another application; Figs. 7, 8, 9, details to be referred to.

The shank *a*, to enter the article of furniture and attach the pad or cushion *b* thereto, is shown in this instance as screw-threaded and provided with a flat head or flange, C.

The cushion or pad *b* is composed of soft or elastic rubber, and in order to attach it securely to the shank *a*, so that the latter may be turned into the wood by twisting the pad *b*, and also to prevent the said pad from becoming forcibly detached from the shank *a* when secured to the furniture, the said shank is provided with a plate or washer, *d*, having a socket, *e*, to receive the shank *a*, which is engaged with the said washer or plate *d*, so as to rotate therewith, as shown, in this instance by projections *f*, entering notches *g* in the said washer.

In order to prevent the washer *d* and the shank *a* engaged therewith, as described, from turning in the rubber *b*, and to insure intimate connection between the rubber and washer, the said washer *d*, shown in this instance as composed of thin sheet metal, is provided with a series of points or prongs, *h*, (best shown in Fig. 2,) around and between which the rubber of the pad passes; and the said washer is also provided with holes *i*, through which the rubber or material of the pad passes. The central portion of the washer *d* has a concave upper surface, as shown in Fig. 1, forming a recess to contain the head *c* of the screw or shank, and the points *h* are turned in the direction in which the shank enters the furniture, so that in case the rubber or pad *b* wears away the said washer will afford a smooth bearing-surface, which on coming in contact with the floor or other surface will not cut or scratch the same, as would the angular surface of the head *c* if projecting beyond and unprotected by such smooth bearing-surface. The washer or disk *d* being formed preferably from sheet metal, and having a concave upper surface, its under surface will consequently be convex, yet it is obvious that should the washer *d* be cast its under surface may be of any desired configuration. By the employment of a washer having a concave upper surface the same cannot be torn away as easily as when a flat washer is employed. It is not essential that the shank $a$ should be screw-threaded, as an ordinary nail or tack will answer, and the plate $d$, by its intimate connection with the rubber, will serve to prevent the same from becoming disengaged or torn off from the shank, and its projecting bearing-surface will prevent the said head from marring objects after the rubber is worn away.

In making the pads the shank is inserted in the opening $e$ of the plate $d$, and the rubber material while in its plastic condition is molded around the same and then vulcanized, the plate $d$ thus becoming thoroughly embedded in and intimately connected with the cushion $b$, which is preferably provided at its middle with a recess, $m$, to receive a nail-set or similar implement by which the shank may be driven wholly or partly into the wood, as may be desired.

In order to facilitate the application of the pad to an article of furniture, I have devised a tool—such as shown in Figs. 5 and 6—consisting, essentially, of a handle or knob, $p$, having recesses $p'$ to receive the pad within it, the inner surface of the said recess being roughened or provided with frictional material—such as sand or emery—which thus takes a firm hold of the pad, enabling it to be turned by the knob with much greater force and facility than it could by the fingers of the operator taking directly hold of the pad. The handle $p$ is also provided with a passage, $r$, which, when the knob is applied to a pad, is in line with the recess $m$, thus forming a guide and holder for the nail-set $t$, which is used when the shank of the pad is unthreaded or consists of a tack or nail.

It is obvious that the plate or washer $d$, instead of being provided with a series of like points or prongs, $h$, may be provided with alternate sharp and dovetailed or blunt-pointed projections $h$, as shown in Fig. 7, where the blank is represented prior to having its prongs upset. By the employment of such alternate pointed and dovetailed or blunt-pointed projections considerable advantage is gained, as the rubber head is less liable to become detached from the said washer and much smaller pads can be used.

I may, if desired, attach the metal washer directly to the metallic shank prior to molding the rubber head thereon without departing from my invention, thus producing a metal shank having a head provided with a series of prongs, as shown in Fig. 8; also, I may simply mold or embed the metal washer in the pad or cushion, as shown in Fig. 9, the said pad or cushion being recessed, as at $x$, to receive an independent screw or other metal fastening.

I claim—

1. The plate or washer $d$, having the socket $e$, prongs $h$, and holes $i$, combined with the shank $a$, having the head $c$, to fit in said socket, and the rubber pad $b$, cast and vulcanized over and about said washer and through its holes, substantially as described.

2. The plate or washer $d$, having the socket $e$, notches $g$, holes $i$, and prongs $h$, combined with the shank $a$, having the head $c$, and projections $f$ engaging said notched socket, and the rubber pad cast and vulcanized about said washer, substantially as described.

3. The washer $d$, having the socket $e$, and the alternate sharp and dovetail projections $h$, combined with the shank $a$, having the head $c$, to fit in said socket, and the rubber pad $b$, cast about and vulcanized upon said washer and its prongs, substantially as and for the purpose described.

In testimony whereof I have signed my name to this specification in the presence of two subscribing witnesses.

PHILIP W. PRATT.

Witnesses:
G. W. GREGORY,
B. J. NOYES.